(12) United States Patent
Zhang

(10) Patent No.: US 11,003,634 B2
(45) Date of Patent: May 11, 2021

(54) DYNAMIC LINKED MULTI-LAYERED BUSINESS OBJECT CONFIGURATIONS

(71) Applicant: Wenli Zhang, San Jose, CA (US)

(72) Inventor: Wenli Zhang, San Jose, CA (US)

(73) Assignee: SAP SE, Walldorf (DE)

( * ) Notice: Subject to any disclaimer, the term of this patent is extended or adjusted under 35 U.S.C. 154(b) by 1067 days.

(21) Appl. No.: 14/457,419

(22) Filed: Aug. 12, 2014

(65) Prior Publication Data

US 2016/0048538 A1  Feb. 18, 2016

(51) Int. Cl.
*G06F 16/20* (2019.01)
*G06F 16/21* (2019.01)

(52) U.S. Cl.
CPC .................. *G06F 16/211* (2019.01)

(58) Field of Classification Search
CPC .................. G06F 17/30864; G06Q 10/10
See application file for complete search history.

(56) References Cited

U.S. PATENT DOCUMENTS

| | | |
|---|---|---|
| 2005/0229186 A1 | 10/2005 | Mitchell et al. |
| 2006/0101091 A1 | 5/2006 | Carbajales et al. |
| 2006/0229888 A1* | 10/2006 | Colle ............ G06Q 10/00 717/108 |
| 2006/0294141 A1 | 12/2006 | Tsang et al. |
| 2008/0005623 A1 | 1/2008 | Said |
| 2008/0010629 A1 | 1/2008 | Berg et al. |
| 2008/0120129 A1* | 5/2008 | Seubert ........... G06Q 10/06 705/35 |
| 2008/0162536 A1 | 7/2008 | Becker et al. |
| 2008/0163253 A1* | 7/2008 | Massmann ........... G06F 9/4435 719/316 |
| 2010/0161648 A1 | 6/2010 | Eberlein et al. |
| 2014/0157154 A1* | 6/2014 | Brunswig ............ G06Q 10/06 715/762 |

FOREIGN PATENT DOCUMENTS

| | | |
|---|---|---|
| EP | 1 494 131 A1 | 1/2005 |
| EP | 2 164 038 A1 | 3/2010 |
| WO | 20051098693 A2 | 10/2005 |

OTHER PUBLICATIONS

Yoder, Joseph W. et al., "Architecture and Design of Adaptive Object-Models", Dec. 2001, ACM Sigplan Notices, V. 36 (12), XP-002249967, (pp. 50-60, 11 pages total).

* cited by examiner

*Primary Examiner* — Kristopher Andersen
(74) *Attorney, Agent, or Firm* — Buckley, Maschoff & Talwalkar LLC

(57) ABSTRACT

A system includes reception of an instruction to determine configuration properties of an instance of a first business object, determination of a first type of the instance of the first business object, determination of whether or not the first type is extendable. In a case it is determined that the first type is extendable, a second reference object is determined, the second reference object conforming to the first type, an instance of the second reference object is determined, configuration properties of the instance of the second reference object are determined, and, in response to the instruction, at least the configuration properties of the instance of the second reference object are returned as the configuration properties of the first instance of the first business object.

19 Claims, 9 Drawing Sheets

New Datastore

| | |
|---|---|
| Name: * | IN-MEMORY_DB_ALIAS |
| Description | |
| Type | IN-MEMORY application cloud |

Credentials

| | |
|---|---|
| Application Type: * | IN-MEMORY |
| Instance: | IN-MEMORY_DATABASE_INSTANCE |

[ Reset ]  [ Save ]  [ Cancel ]

New Application

| Name: * | IN-MEMORY_DATABASE_INSTANCE |
|---|---|
| Type: * | IN-MEMORY |
| Host Name: * | pal00383747a.dhcp.pal.sapse.corp |
| Port: * | 30115 |
| Username: * | JANE |
| Password: | DBADMIN |
| Alias Name: | HANA_INSTANCE |
| Owner Name: | dbo |
| Production Only: | ☐ |
| Allow View Data: | ☐ |
| Enabled: | ☑ |

Save   Cancel

*FIG. 4*

New Datastore — 300

Name: * [IN-MEMORY_DB_ALIAS]

Description

Type [IN-MEMORY application cloud]

Credentials

Application Type: * [IN-MEMORY]

Instance: [IN-MEMORY_DATABASE_INSTANCE]

[Reset] [Save] [Cancel]

New Application — 400

Name: * [IN-MEMORY_DATABASE_INSTANCE]

Type: * [IN-MEMORY]

Host Name: * [pal00383747a.dhcp.pal.sapse.corp]

Port: * [30115]

Username: * [JANE]

Password: [DBADMIN]

Alias Name: [HANA_INSTANCE]

Owner Name: [dbo]

Production Only: ☐

Allow View Data: ☐

Enabled: ☒

[Save] [Cancel]

*FIG. 5*

DYNAMIC LINKED MULTI-LAYERED BUSINESS OBJECT CONFIGURATIONS

BACKGROUND

According to conventional database architectures, a client application interacts with a database application executing on a database application server. In response to requests received from the client application, the database application acquires stored data from an underlying database system, performs any necessary processing, and provides the data to the client application.

The data is typically encapsulated within business objects, and the aforementioned requests, storage and processing are each performed with respect to such business objects. According to conventional business software terminology, a business object is an object model representing real-world items used during the transaction of business. For example, a business object may represent a business document such as a sales order, a purchase order, or an invoice. A business object may also represent items such as a product, a business partner, or a piece of equipment. Particular documents (e.g., SalesOrder SO435539) and/or items (e.g., ACME corporation) are represented by instances of their representing business object, or business object instances.

Business object configurations are used in the development of database applications. A business object configuration is a set of properties associated with a business object. A business object may store its own business object configuration, or the business object configuration may be stored in a supporting object.

BRIEF DESCRIPTION OF THE DRAWINGS

FIG. 3 is a view of a user interface to define business object configuration properties according to some embodiments.

FIG. 4 is a view of a user interface to define business object configuration properties according to some embodiments.

FIG. 5 illustrates linking of business object configuration properties according to some embodiments.

DETAILED DESCRIPTION

The following description is provided to enable any person in the art to make and use the described embodiments. Various modifications, however, will remain readily apparent to those in the art.

Figure 1:
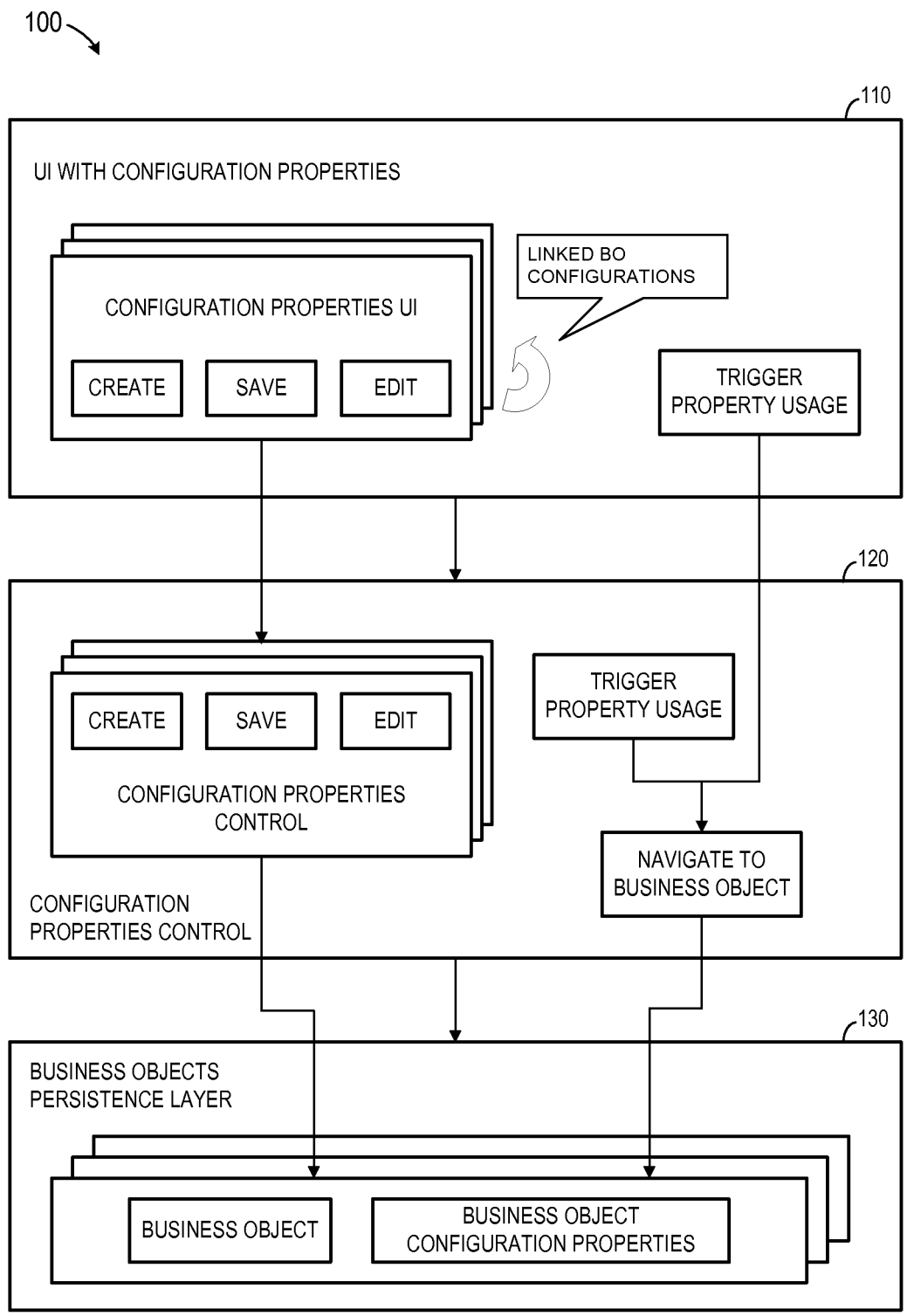
FIG. 1 is a block diagram of a system according to some embodiments.

FIG. 1 is a block diagram of system 100 according to some embodiments. System 100 includes user interface (UI) layer 110, controller layer 120 and persistence layer 130.

According to some embodiments, linked business object configurations are created within UI layer 110. UI layer 110 may also provide interfaces to edit, save and delete configurations. As also shown, usage of business object configuration properties may be triggered from UI layer 110.

UI layer 110 may be implemented by one or more devices executing program code of a software application for presenting user interfaces to allow interaction with controller layer 120. The user interfaces may comprise user interfaces suited for development and/or administration of system 100.

Presentation of a user interface by UI layer 110 may comprise any degree or type of rendering, depending on the type of UI code used. For example, UI layer 110 may execute a Web Browser to request and receive a Web page (e.g., in HTML format) from controller layer 120 via HTTP, HTTPS, and/or WebSocket, and may render and present the Web page according to known protocols. UI layer 110 may also or alternatively present user interfaces by executing a standalone executable file (e.g., an .exe file) or code (e.g., a JAVA applet) within a virtual machine. According to some embodiments, UI layer 110 is implemented via executable code using JavaScript UI libraries for functionality, and JavaScript Object Notation (JSON) and eXtended Markup Language (XML) for data interchange.

Controller layer 120 provides functions to create, save, edit and delete business object configuration properties as described herein. When UI layer 110 or a function executing in controller layer 120 triggers the usage of a business object configuration, controller layer 120 retrieves the configuration properties as described below with respect to FIGS. 7 and 8. The common views, individual views and custom views of object properties may be implemented in JavaScript files.

Controller layer 120 may comprise an application server executing database applications. The database applications may comprise server-side executable program code (e.g., compiled code, scripts, etc.) which provide user interfaces to UI layer 110, receive requests therefrom, retrieve data from persistence layer 130 based on the requests, process the data retrieved from persistence layer 130, and provide the processed data to UI layer 110.

Controller layer 120 may provide application services to such applications in order to facilitate the foregoing functionality. In this regard, functions which are attributed to controller layer 120 herein may be implemented in executable code of database applications and/or of application services provided by controller layer 120. A Java Servlet may be used to implement a server-side call to retrieve and pass configuration properties between UI layer 110 and persistence layer 130 as described herein, whereas other classes and files may conform to Java, XML, etc.

Controller layer 120 provides any suitable interfaces for communication with UI layer 110. For example, controller layer 120 may include a HyperText Transfer Protocol (HTTP) interface supporting a transient request/response protocol over Transmission Control Protocol (TCP), and/or a WebSocket interface supporting non-transient full-duplex communications between controller layer 120 and UI layer 110 over a single TCP connection.

Controller layer 120 may communicate with persistence layer 130 using database management interfaces such as, but not limited to, Open Database Connectivity (ODBC) and Java Database Connectivity (JDBC) interfaces. Structured Query Language (SQL) may be used to manage and query data stored in persistence layer 130.

Persistence layer 130 stores data logically encapsulated as business objects. Configuration properties of a business object may be stored in the business object or in an associated business object configuration properties object. As will be described below, configuration properties of a business object may also include a reference type and a business object instance of the reference type. Persistence layer 130 may store metadata defining structure and functionality of the business objects and business object configuration properties objects.

Persistence layer 130 may also provide application logic, such as database procedures and/or calculations, according to some embodiments. The application logic may comprise scripts, functional libraries and/or compiled program code.

Persistence layer 130 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Persistence layer 130 may comprise any query-responsive data source or sources that are or become known, including but not limited to a structured-query language (SQL) relational database management system. Persistence layer 130 may comprise a relational database, a multi-dimensional database, an eXtendable Markup Language (XML) document, or any other data storage system storing structured and/or unstructured data. The data of persistence layer 130 may be distributed among several relational databases, dimensional databases, and/or other data sources. Embodiments are not limited to any number or types of data sources.

In some embodiments, the data of Persistence layer 130 may comprise one or more of conventional tabular data, row-based data, column-based data, and object-based data. Moreover, the data may be indexed and/or selectively replicated in an index to allow fast searching and retrieval thereof. Persistence layer 130 may support multi-tenancy to separately support multiple unrelated clients by providing multiple logical database systems which are programmatically isolated from one another.

Figure 2:
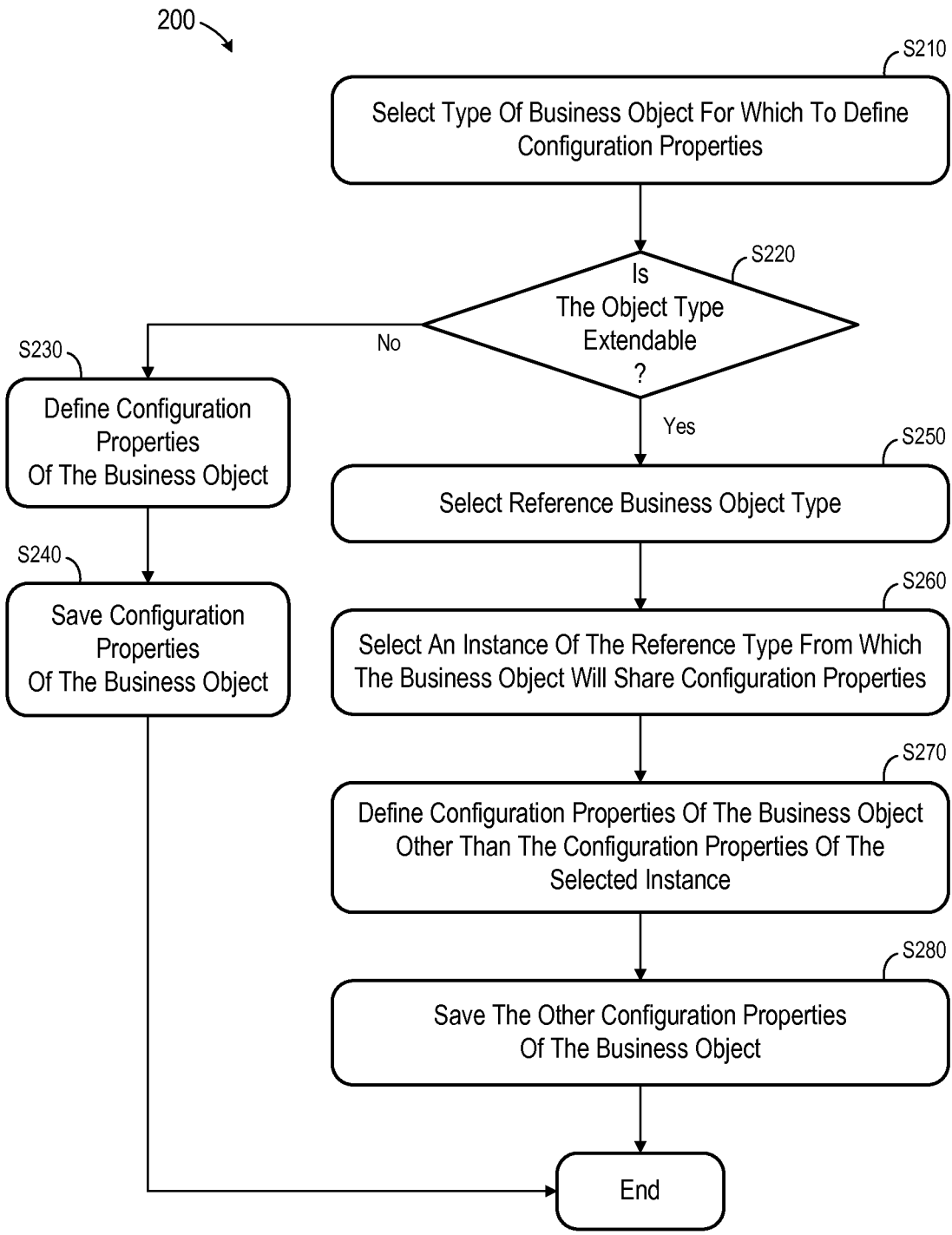
FIG. 2 is a flow diagram of a process according to some embodiments.

FIG. 2 comprises a flow diagram of process 200 according to some embodiments. In some embodiments, various hardware elements of controller layer 120 (e.g., one or more processors) execute program code to perform process 200. Process 200 and all other processes mentioned herein may be embodied in processor-executable program code read from one or more of non-transitory computer-readable media, such as a floppy disk, a disk-based or solid-state hard drive, CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 200 is executed to define configuration properties for a business object. At S210, a type of the business object is selected. FIG. 3 is an outward view of user interface 300 to define configuration properties for a datastore object. User interface 300 may be presented by UI layer 110 using any rendering implementation discussed herein or otherwise known. As shown, a user has input the business object name IN-MEMORY_DB_ALIAS in user interface 300 and selected business object type IN-MEMORY application cloud. The selection of business object type may be facilitated by a drop-down menu which lists types associated with the business object (e.g., the datastore business object).

Next, at S220, it is determined whether the selected business object type is extendable. As used herein, "extendable" indicates that a business object of this type shares one or more configuration properties with a business object instance (i.e., a "reference" instance) of another business object type (i.e., a "reference" type). The determination at S220 may be based on metadata defining the selected business object type. The metadata may, for example, indicate that the selected business object type is extendable and may also indicate one or more reference types which may share configuration properties with the selected business object type.

Flow proceeds from S220 to S230 if it is determined that the object type is not extendable. In such a case, configuration properties of the business object are defined at S230 as is known in the art. The configuration properties are saved (e.g., in response to selection of the Save control of user interface 300) at S240, within the business object itself or in an associated object (e.g., a business object configuration properties object) as described above.

Flow proceeds from S220 to S250 in a case that the selected object type is determined to be extendable. A reference business object type is selected at S250. According to the present example, selection of the type IN-MEMORY application cloud at S210 results in display of the Credentials portion of user interface 300. The user may then select the reference business object type using the Application Type input field. As mentioned above, the Application Type input field may consist of a drop-down menu including those business object types which may be used as reference object type for the type of business object selected at S210, as defined by the metadata of the business object.

Next, an instance of the reference type is selected at S260. The instance is an instance from which the business object (e.g., IN-MEMORY_DB_ALIAS) will share one or more configuration properties. According to the present example, the selected instance is IN-MEMORY_DATABASE_INSTANCE.

FIG. 4 illustrates an outward view of user interface 400 for specifying configuration properties of the selected instance is IN-MEMORY_DATABASE_INSTANCE. According to some embodiments, configuration properties of the selected instance may be specified prior to S260. In some embodiments, these configuration properties may be specified after S260, for example by presenting user interface 400 after S260 and in response to user selection of the Save control of user interface 300.

The Type input field of user interface 400 shows the selected reference type and the Name input field of user interface 400 shows the selected reference instance according to the present example. The remaining input fields allow the user to specify other configuration properties, which are saved in persistence layer 130 upon selection of the Save control of user interface 400.

It should be noted that the business object type specified in user interface 400 may also be extendable. In such a case, a reference object type and reference object instance are determined for the business object type as previously described. Some embodiments may therefore provide multiple layers of linked business object configuration properties. An example of this multi-layer linkage will be described below with respect to FIG. 6.

Returning to process 200, configuration properties other than the configuration properties of the selected instance are defined at S270. In this regard, the business object will share some properties with its referenced instance but most likely will also require other configuration properties. At S280, these other configuration properties are stored in persistence layer 130 in the business object or in an associated business object configuration properties object.

FIG. 5 illustrates sharing of configuration properties according to the present example. As shown, the IN-MEMORY_DB_ALIAS datastore object is linked to the Alias Name and Owner Name configuration properties of the IN_MEMORY_DATABASE_INSTANCE instance of the IN-MEMORY application type.

Figure 6:
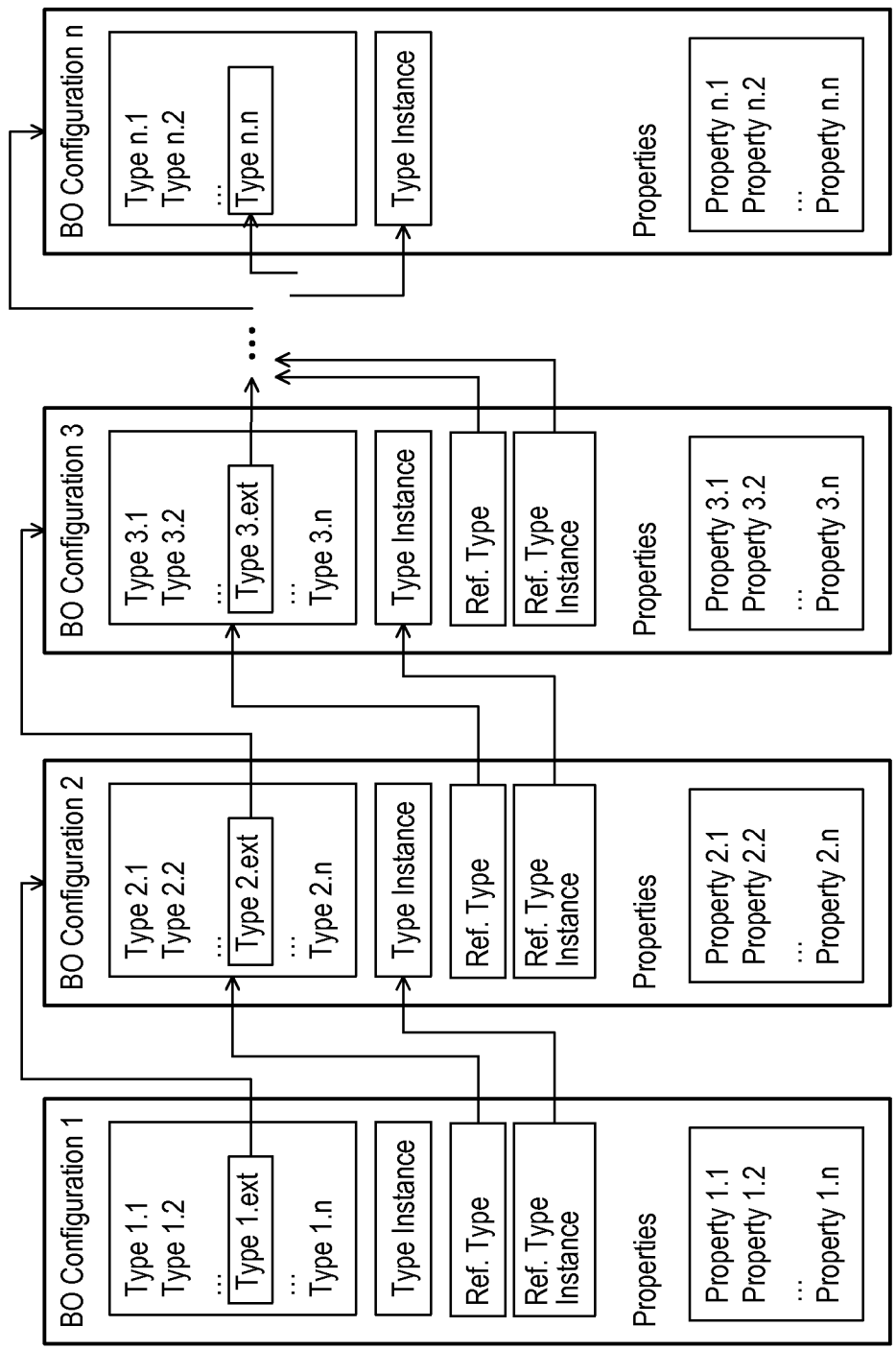
FIG. 6 illustrates cascaded linking of business object configuration properties according to some embodiments.

FIG. 6 illustrates a more general case of configuration property linking according to some embodiments. The relationships shown in FIG. 6 may be represented in metadata defining each business object configuration. It will be assumed that each business object configuration 1-n is associated with a respective business object 1-n. Each business object configuration 1-n may be stored in persistence layer 130.

Business object configuration 1 indicates that business object 1 includes several types 1.1-1.n. One of these types, "type1.ext", is extendable. The extendable type is associated with business object 2, and arrows indicate a reference type which is one of the business object types of business object 2. Arrows also indicate the instance of business object 2 which is the reference instance of business object configuration 1.

Similar relationships are illustrated with respect to business object configuration 2 and business object configuration 3. Specifically, business object type "type2.ext", is extendable and is associated with business object 3. Arrows indicate the business object type of business object 3 which is the reference type of business object configuration 2, and the instance of business object 3 which is the reference instance of business object configuration 2.

This cascading set of relationships may continue for any number of intermediate levels, ending at business object configuration n because the selected type of business object configuration n, "type n.n", is not extendable. Business object configuration includes a business object type which is the reference type of business object configuration n-1 (not shown), and an instance which is the reference instance of business object configuration n-1.

Some embodiments may thereby allow efficient reuse of already-specified business object configuration properties. This reuse may reduce the amount of memory space required to store business object configuration properties.

Figure 7:
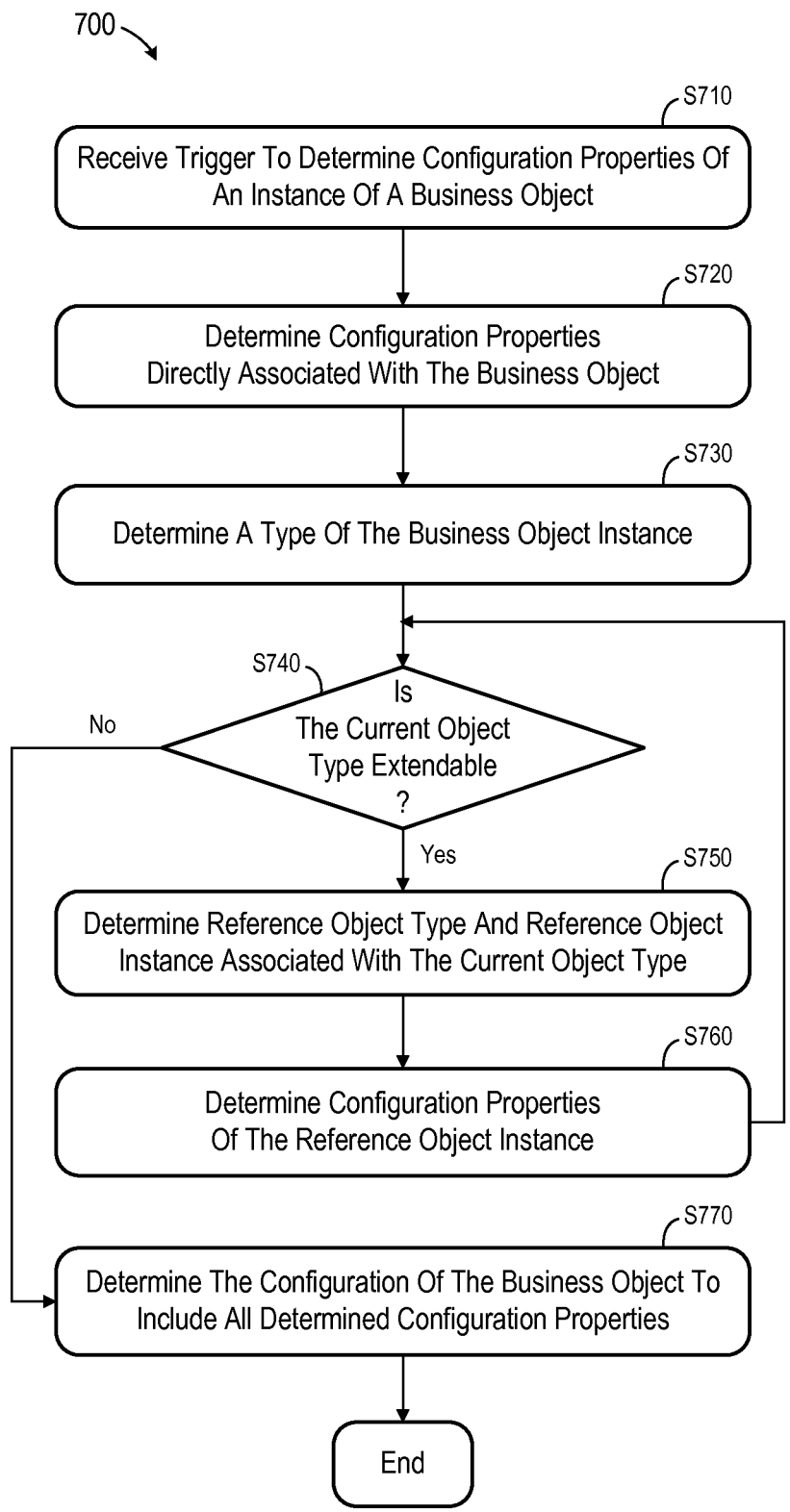
FIG. 7 is a flow diagram of a process according to some embodiments.

FIG. 7 is a flow diagram of process 700 to use business object configuration properties which are linked as described herein. Initially, at S710, a trigger to determine configuration properties of an instance of a business object is received. The trigger may originate in UI layer 110 or in controller layer 120 as shown in FIG. 1. In one example, the trigger is a request generated in UI layer 110 to view the configuration properties. In another example, the trigger is a function executing in controller layer 120 which requires usage of the instance of the business object. With respect to the example of FIGS. 3-5, the trigger may be a function for handling the IN-MEMORY_DB_ALIAS datastore object instance.

Configuration properties which are directly associated with the business object instance are determined at S720. As described with respect to S270 of FIG. 2, the business object instance may be associated with configuration properties within the business object itself or in a configuration properties object associated therewith. If so, these configuration properties are retrieved at S720.

Next, at S730, the type of the business object instance is determined. If the type is not extendable (as defined by metadata of the business object), flow proceeds to S770, where the configuration of the business object is determined to include all previously-determined configuration properties. In the present example, these configuration properties consist only of the configuration properties determined at S730.

If the type is determined to be extendable at S740, the reference object type and the reference object instance associated with the extendable object type are determined at S750. As described above, and illustrated in FIG. 6, these associations are reflected in the metadata of the business objects.

Configuration properties of the reference object instance are determined at S760. These configuration properties are determined from the reference business object itself or from a configuration properties object associated with the reference business object in persistence layer 130. Flow then returns to S740.

Upon return to S740, it is determined whether the current object type (i.e., the type of the reference object most-recently determined at S750) is extendable. If not, flow continues to S770, where the configuration of the business object instance is determined to include the configuration properties determined at S720 and in S760.

If the type of the most-recently determined reference object is determined to be extendable at S740, flow proceeds to S750 and continues as described above. That is, yet another reference object type and reference object instance are determined at S750, and configuration properties of this newly-determined reference object instance are determined at S760. Flow therefore cycles between S740, S750 and S760 as long as a most-recently determined object type is determined to be extendable.

Once the most-recently determined object type is determined to be not extendable, the configuration properties of the original business object instance are determined to be the combination of all configuration properties determined during execution of process 700.

Figure 8:
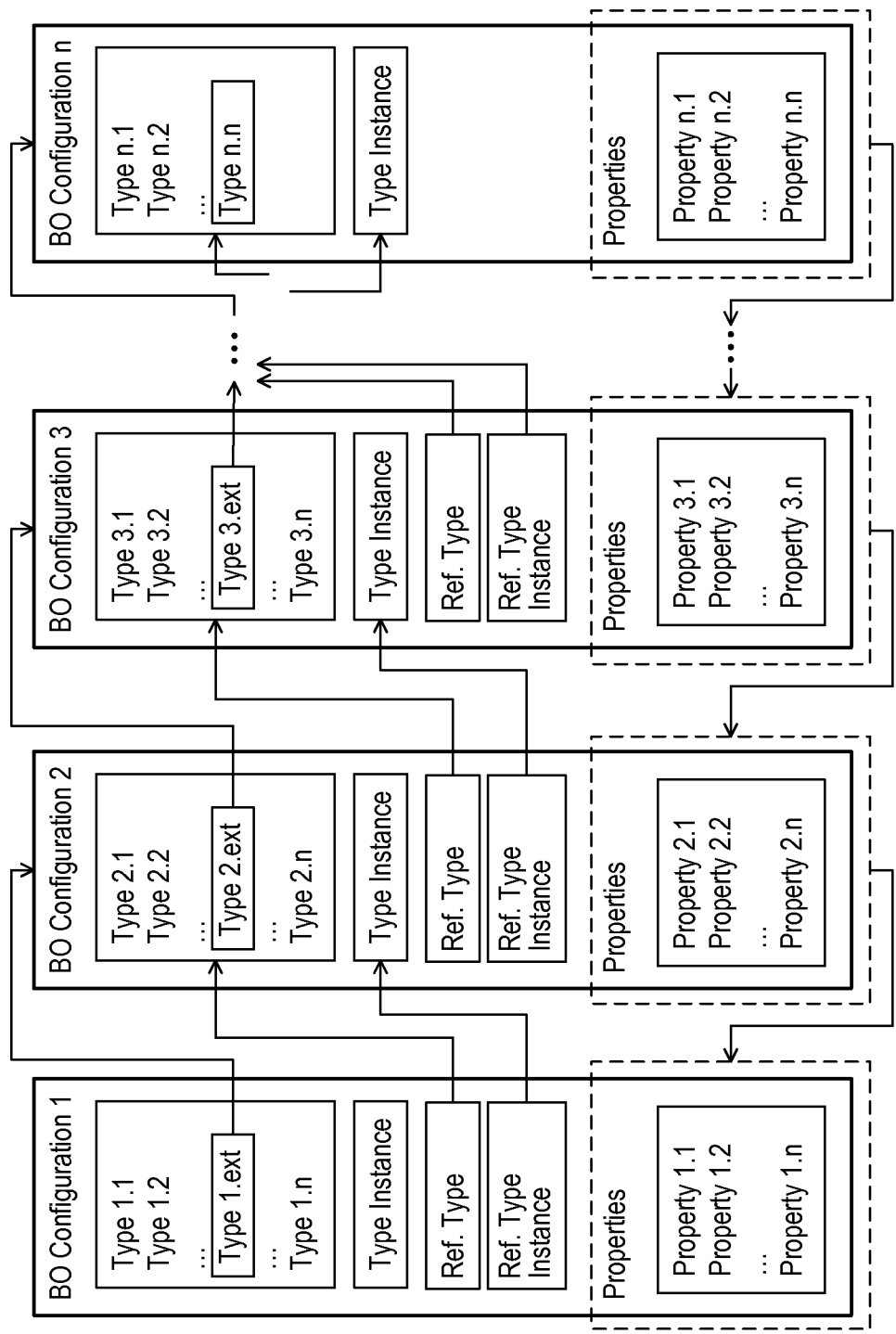
FIG. 8 illustrates cascaded determination of linked business object configuration properties according to some embodiments.

FIG. 8 illustrates such a combination of configuration properties according to some embodiments. The relationships between the object types and instances of FIG. 8 were described above with respect to FIG. 6. FIG. 8 further illustrates how these relationships result in the determination of configuration properties for particular business object instances.

As shown, for the types and instances which are illustrated as associated, business object configuration 1 is determined during process 700 to include properties 1.1-1.n, 2.1-2.n, 3.1-3.n, . . . , n.1-n.n. Similarly, business object configuration 2 is determined to include properties 2.1-2.n, 3.1-3.n, . . . , n.1-n.n, and business object configuration 3 is determined to include properties 3.1-3.n, . . . , n.1-n.n.

Figure 9:
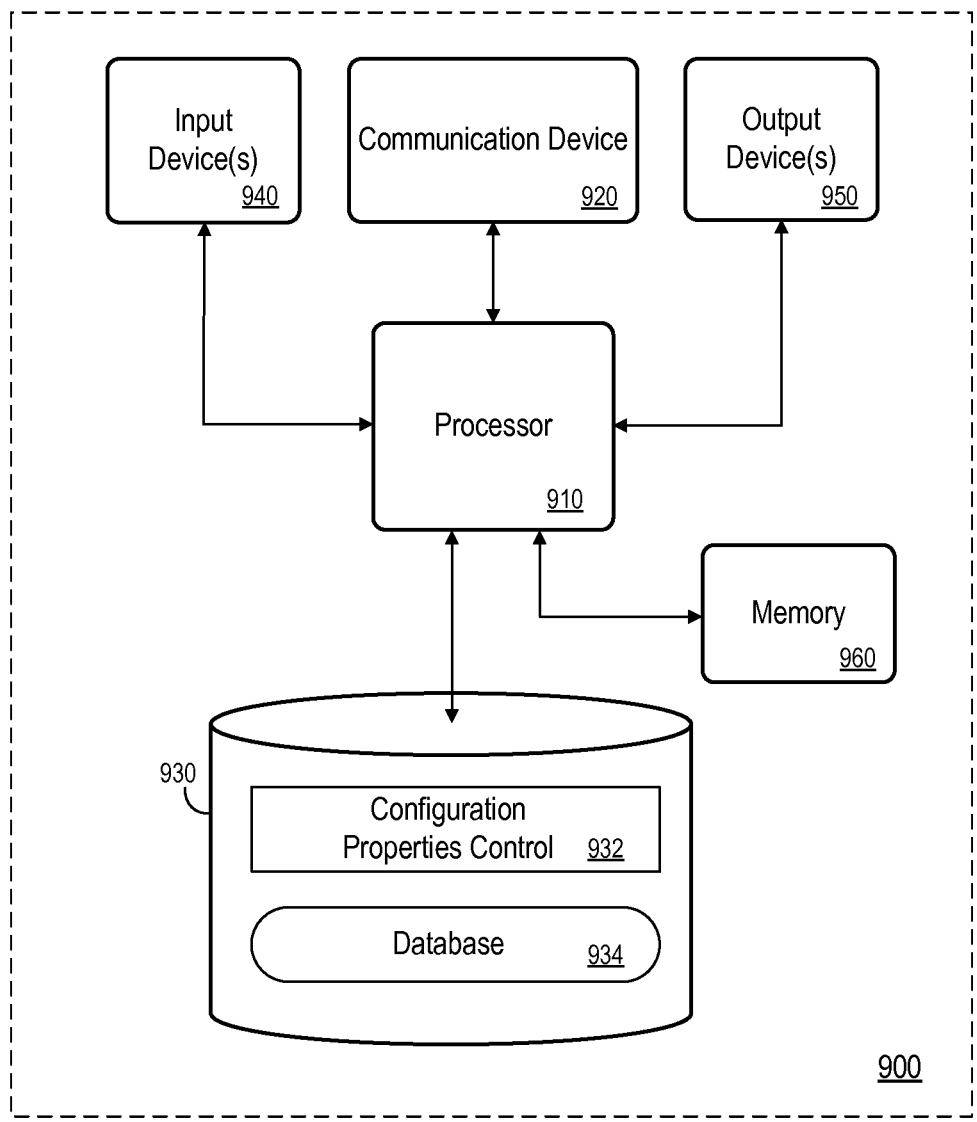
FIG. 9 is a block diagram of an apparatus according to some embodiments.

FIG. 9 is a block diagram of apparatus 900 according to some embodiments. Apparatus 900 may comprise a general-purpose computing apparatus and may execute program code to perform any of the functions described herein. Apparatus 900 may comprise an implementation of controller layer 120 and persistence layer 130 in some embodiments. Apparatus 900 may include other unshown elements according to some embodiments.

Apparatus 900 includes processor 910 operatively coupled to communication device 920, data storage device 930, one or more input devices 940, one or more output devices 950 and memory 960. Communication device 920 may facilitate communication with external devices, such as a reporting client, or a data storage device. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into apparatus 900. Output device(s) 950 may comprise, for example, a display (e.g., a display screen) a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, etc., while memory 960 may comprise Random Access Memory (RAM).

Configuration properties control 932 may comprise program code executed by processor 910 to cause apparatus 900 to perform any one or more of the processes described herein. Embodiments are not limited to execution of these processes by a single apparatus. Database 934 may include database data as described above. As also described above, database data (either cached or a full database) may be stored in volatile memory such as memory 960. Data storage device 930 may also store data and other program code for providing additional functionality and/or which are necessary for operation of apparatus 900, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units.

Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable process steps; and
a processor to execute the processor-executable process steps to cause the system to:
receive an instruction to determine configuration properties of an instance of a first business object, wherein the configuration properties of the instance of the first business object are determined from a configuration properties object associated with the instance of the first business object;
select a first type of the instance of the first business object;
determine, based on metadata defining each business object configuration, whether or not the first type of the instance of the first business object is extendable by determining whether or not the first type of the instance of the first business object shares one or more configuration properties with a business object instance of a reference object type; and
in a case where it is determined that the first type is extendable,
obtain a first reference object type conforming to the first type of the instance of the first business object,
obtain an instance of the first reference object associated with the instance of the first business object,
obtain specified configuration properties of the instance of the first reference object, and
reuse the specified configuration properties of the instance of the first reference object obtained in the obtaining step by returning, in response to the instruction, at least the specified configuration properties of the instance of the first reference object as the configuration properties of the instance of the first business object.

2. The system according to claim 1, wherein obtaining the instance of the first reference object comprises obtaining configuration properties of a configuration properties business object associated with the instance of the first business object.

3. The system according to claim 1, wherein obtaining the specified configuration properties of the instance of the first reference object comprises obtaining configuration properties of a configuration properties business object associated with an instance of a second business object.

4. The system according to claim 1, wherein the processor is further to execute the processor-executable process steps to cause the system to:
select a second type of the instance of the second business object;
determine, based on metadata defining each business object configuration, whether or not the second type of the instance of the second business object is extendable; and
in a case where it is determined that the second type is extendable,
obtain a second reference object type conforming to the second type of the instance of the second business object;
obtain an instance of the second reference object associated with the instance of the second business object;
obtain specified configuration properties of the instance of the second reference object; and
reuse the specified configuration properties of the instance of the second reference object obtained in the obtaining step by returning, in response to the instruction, at least the specified configuration properties of the instance of the second reference object and the configuration properties of the instance of the first reference object as the configuration properties of the instance of the first business object.

5. The system according to claim 4, wherein obtaining the specified configuration properties of the instance of the first reference object comprises obtaining configuration properties of a configuration properties business object associated with the instance of the second business object, and
wherein obtaining the specified configuration properties of the instance of the second reference object comprises obtaining configuration properties of a configuration properties business object associated with an instance of a third business object.

6. The system of claim 1, wherein in a case where it is determined that the first type is not extendable, saving the configuration properties within the first business object itself.

7. The system of claim 1, wherein selecting a first type of the instance of the first business object comprises receiving a reference object type selection from a user.

8. The system of claim 1, wherein obtain specified configuration properties of the instance of the first reference object comprises obtaining a portion of the configuration properties of the instance of the first reference object, and wherein returning in response to the instruction comprises returning the portion of the configuration properties of the instance of the first reference object as the configuration properties of the instance of the first business object.

9. The system of claim 8, further comprising processor-executable process steps to cause the system to:
define new configuration properties other than the returned portion of the configuration properties; and
define a new business object comprising the returned portion of the configuration properties and the new configuration properties.

10. A computer-implemented method comprising:
receiving an instruction to determine configuration properties of an instance of a first business object, wherein the configuration properties of the instance of the first business object are determined from a configuration properties object associated with the instance of the first business object;
selecting a first type of the instance of the first business object;
determining, based on metadata defining each business object configuration, that the first type of the instance of the first business object is extendable by determining that the first type of the instance of the first business object shares one or more configuration properties with a business object instance of a reference object type; and
in response to the determination that the first type is extendable,
obtaining a first reference object type conforming to the first type of the instance of the first business object,
obtaining an instance of the first reference object associated with the instance of the first business object,
obtaining specified configuration properties of the instance of the first reference object, and
reusing the specified configuration properties of the instance of the first reference object obtained in the obtaining step by returning, in response to the instruction, at least the specified configuration properties of the instance of the first reference object as the configuration properties of the instance of the first business object.

11. The computer-implemented method according to claim 10, wherein obtaining the instance of the first reference object comprises obtaining configuration properties of a configuration properties business object associated with the instance of the first business object.

12. The computer-implemented method according to claim 10, wherein obtaining the specified configuration properties of the instance of the first reference object comprises obtaining configuration properties of a configuration properties business object associated with an instance of a second business object.

13. The computer-implemented method according to claim 10, further comprising:
selecting a second type of the instance of the second business object;
determining, based on metadata defining each business object configuration, that the second type of the instance of the second business object is extendable; and
in response to the determination that the second type is extendable,
obtaining a second reference object type-conforming to the second type of the instance of the second business object,
obtaining an instance of the second reference object associated with the instance of the second business object,
obtaining specified configuration properties of the instance of the second reference object, and
reusing the specified configuration properties of the instance of the second reference object obtained in the obtaining step by returning, in response to the instruction, at least the specified configuration properties of the instance of the second reference object and the configuration properties of the instance of the first reference object as the configuration properties of the instance of the first business object.

14. The computer-implemented method according to claim 13, wherein obtaining the specified configuration properties of the instance of the first reference object comprises obtaining configuration properties of a configuration properties business object associated with the instance of the second business object, and
wherein obtaining the specified configuration properties of the instance of the second reference object comprises obtaining configuration properties of a configuration properties business object associated with an instance of a third business object.

15. A non-transitory computer-readable medium storing program code, the program code executable by a computer system to cause to the computer system to:
receive an instruction to determine configuration properties of an instance of a first business object, wherein the configuration properties of the instance of the first business object are determined from a configuration properties object associated with the instance of the first business object;
select a first type of the instance of the first business object;
determine, based on metadata defining each business object configuration, whether or not the first type of the instance of the first business object is extendable by determining whether or not the first type of the instance of the first business object shares one or more configuration properties with a business object instance of a reference object type; and
in a case where it is determined that the first type is extendable,
obtain a first reference object type conforming to the first type of the instance of the first business object;
obtain an instance of the first reference object associated with the instance of the first business object;
obtain specified configuration properties of the instance of the first reference object; and
reuse the specified configuration properties of the instance of the first reference object obtained in the obtaining step by returning, in response to the instruction, at least the specified configuration properties of the instance of the first reference object as the configuration properties of the instance of the first business object.

16. The non-transitory computer-readable medium according to claim 15, wherein obtaining the instance of the first reference object comprises obtaining configuration properties of a configuration properties business object associated with the instance of the first business object.

17. The non-transitory computer-readable medium according to claim 15, wherein obtaining the specified configuration properties of the instance of the first reference object comprises obtaining configuration properties of a configuration properties business object associated with an instance of a second business object.

18. The non-transitory computer-readable medium according to claim 15, the program code further executable by a computer system to cause to the computer system to:
   select a second type of the instance of the second business object;
   determine, based on metadata defining each business object configuration, whether or not the second type of the instance of the second business object is extendable; and
   in a case where it is determined that the second type is extendable,
      obtain a second reference object type conforming to the second type of the instance of the second business object;
      obtain an instance of the second reference object associated with the instance of the second business object;
      obtain specified configuration properties of the instance of the second reference object; and
      reuse the specified configuration properties of the instance of the second reference object obtained in the obtaining step by returning, in response to the instruction, at least the specified configuration properties of the instance of the second reference object and the configuration properties of the instance of the first reference object as the configuration properties of the instance of the first business object.

19. The non-transitory computer-readable medium according to claim 18, wherein obtaining the specified configuration properties of the instance of the first reference object comprises obtaining configuration properties of a configuration properties business object associated with the instance of the second business object, and
   wherein obtaining the specified configuration properties of the instance of the second reference object comprises obtaining configuration properties of a configuration properties business object associated with an instance of a third business object.

* * * * *